July 4, 1933.  V. F. ZAHODIAKIN  1,916,550
INTERNAL COMBUSTION ENGINE
Filed May 14, 1931   7 Sheets-Sheet 1

INVENTOR.
Victor F. Zahodiakin
BY
Wood & Wood ATTORNEYS

July 4, 1933.    V. F. ZAHODIAKIN    1,916,550
INTERNAL COMBUSTION ENGINE
Filed May 14, 1931    7 Sheets-Sheet 3

INVENTOR.
Victor F. Zahodiakin
BY
Wood & Wood
ATTORNEYS

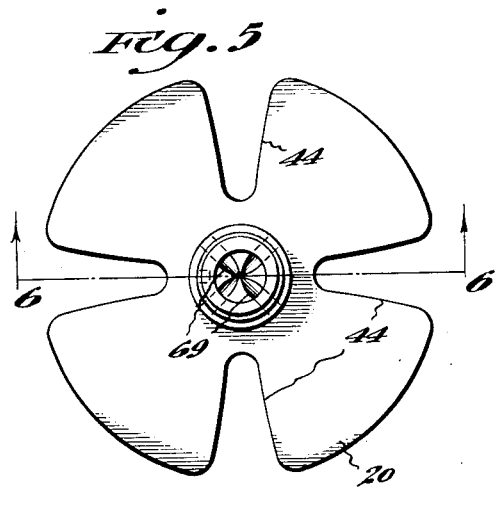
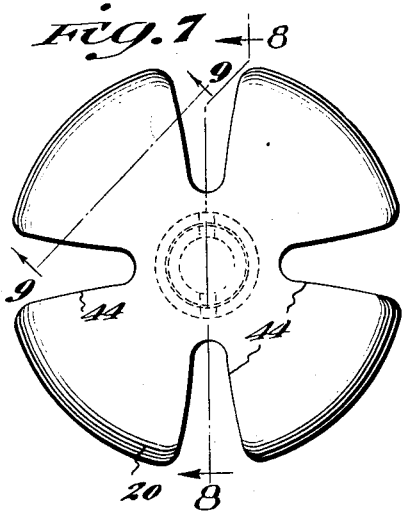
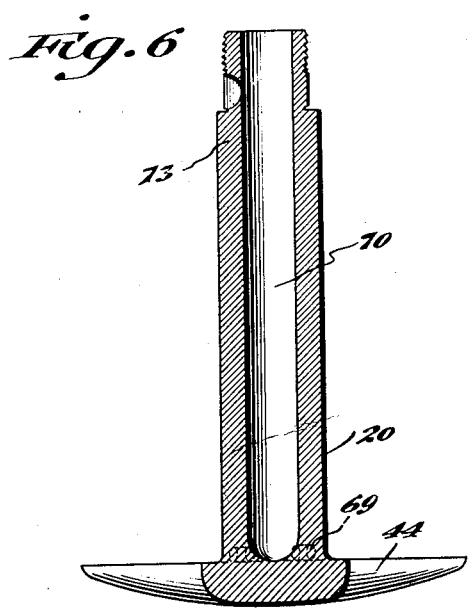
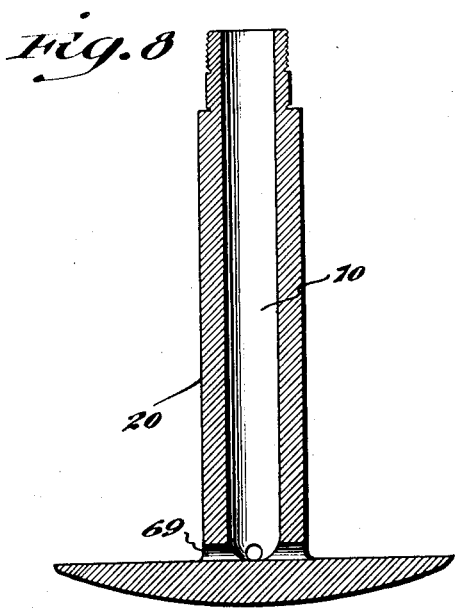

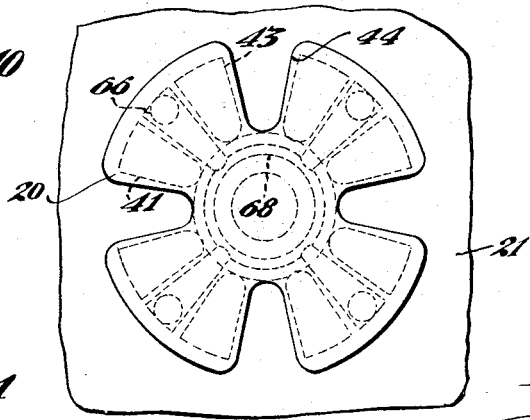
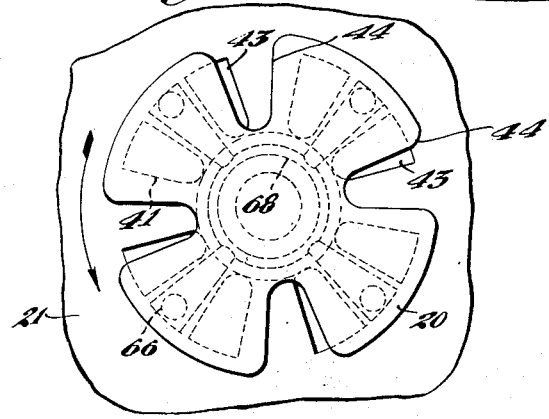
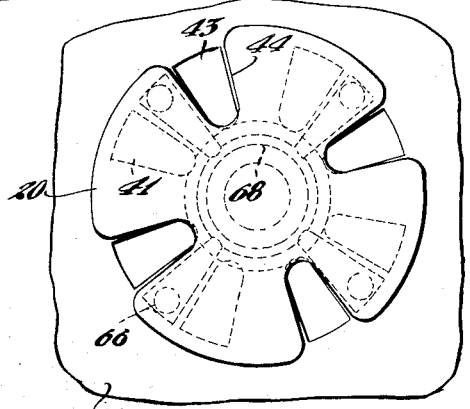
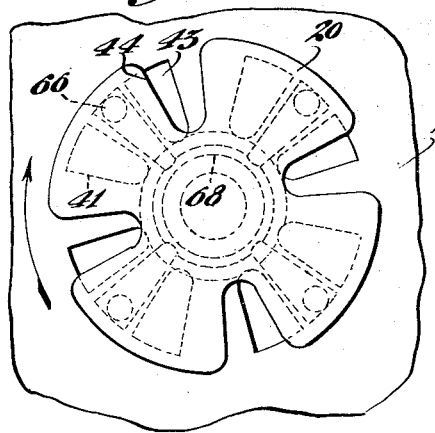
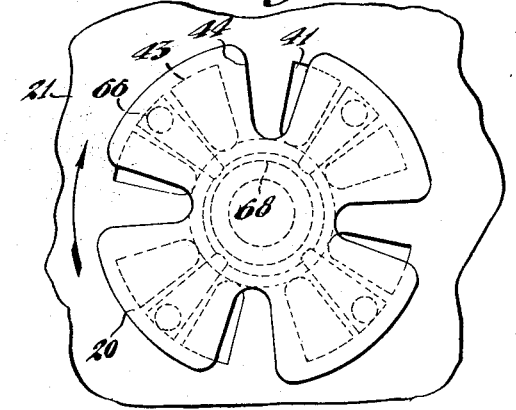

Patented July 4, 1933

1,916,550

UNITED STATES PATENT OFFICE

VICTOR F. ZAHODIAKIN, OF CINCINNATI, OHIO, ASSIGNOR TO THE STANWOOD CORPORATION, OF CINCINNATI, OHIO, A CORPORATION OF OHIO

INTERNAL COMBUSTION ENGINE

Application filed May 14, 1931. Serial No. 537,373.

This invention relates to internal combustion engines and is particularly directed to improvements in the valves controlling the inlet and exhaust ports to the respective cylinders of the engine and to the operating means and lubricating and cooling devices associated with the valves.

It is an object of this invention to provide oscillating valves for the respective cylinders wherein the valves are efficiently and conveniently located in the cylinder head and a single valve accomplishes the control of the exhaust and inlet ports, preferably a plurality of each, for each cylinder, and wherein the valves are stationary during the exhaust and compression strokes of their respective pistons.

Inasmuch as each valve is rotatably mounted within the cylinder head and is oscillated to cover and uncover the respective ports of the particular cylinder, it is, therefore, another object to provide an improved means and arrangement for the oscillating valves whereby they are snugly seated at all times. There is a decided advantage resulting from the location of the valve in the cylinder head in that the spark plug or plugs for the cylinder may be mounted in the cylinder block and extended laterally into the cylinder which places the spark or sparks at the most appropriate and efficient point or points within the firing chamber of the cylinder.

It is another object of this invention to provide a cooling and lubricating medium for the valves in the form of a constant oil pressure supply means, efficiently related to the valve whereby the oil passes across the valve seat and around or through the valve stem and which oil supply means extends between the exhaust and inlet ports in the cylinder head for cooling the valves and cylinder head at these points. It is a further advantage in connection with the foregoing that the valves may be formed of hardened steel since there is a great reduction in the heat of the valve and no tendency to destroy the temper of the valves.

Also it is provided that the lubricant is supplied through an independent pump as considered relative to the conventional oil pump for the motor, which pump is located in an extra cooling compartment for lowering the temperatures present in the oil resulting from its contact with the heated valve and surrounding area. The further object, therefore, is to radically reduce the temperatures of the valves and to lubricate the same constantly under pressure since the valves of the motor present the most difficult problem in cooling and lubricating the motor, and to provide for this purpose a constant, preferably independent, oil circulation at the valves including in the cylinder head an oil chamber which receives the oil additionally cooling the same and which is connected by suitable piping to the extra cooling compartment or pump for the valve supply system. A water jacket may also be included within the cylinder head about the inlet and exhaust ports.

It is a further object of the invention to provide an improved valve structure wherein the head is detachable and the head is flexibly mounted relative to the stem for extreme flexibility and universal motion to permit the valve head to automatically compensate in its position for expansion and contraction of the cylinder head and other parts due to the variable temperature of the combustion engine whereby perfect valve seating is constantly maintained.

It is a further object to provide a valve having a specially formed head which tends to eliminate pre-ignition by rapid dissipation and uniform distribution of the heat and the elimination of sharp corners.

It is a general object to provide a more perfect combustion chamber, greater area of exhaust and inlet openings, finer volumetric efficiency, quicker acceleration and more power and the result that he age of the engine does not affect the valves because of proper oiling and cooling, universal valve seating, and thermostatic control.

Other objects and certain advantages will be more fully apparent from a description of the accompanying drawings, in which:

Figure 5 is a top plan view of the valve showing the peripheral grooving of the head thereof.

Figure 6 is a sectional view taken on line 6—6, Figure 5, illustrating the spherical cross sectional contour of the head and the tubular stem for oil circulation.

Figure 7 is a bottom plan view of the valve.

Figure 8 is a sectional view taken on line 8—8, Figure 7, at an angle to Figure 6, for further illustrating the construction of the valve and the oil grooving thereof.

Figure 9 is a sectional view taken on line 9—9, Figure 7, illustrating the spherical cross sectional contour of the valve head between the slots thereof.

Figure 10 is a diagrammatic view illustrating a valve in position during the firing and compression strokes of the particular piston with which it is associated.

Figure 11 is a diagrammatic view similar to Figure 10, but showing the valve being oscillated to uncover the exhaust ports.

Figure 12 is a similar view but showing the valve fully oscillated to position for exhausting the cylinder with the exhaust ports fully uncovered.

Figure 13 is a similar view but showing the valve being oscillated back to cover the exhaust ports.

Figure 14 is a similar view but showing the valve moving to uncover the inlet ports.

Figure 1:
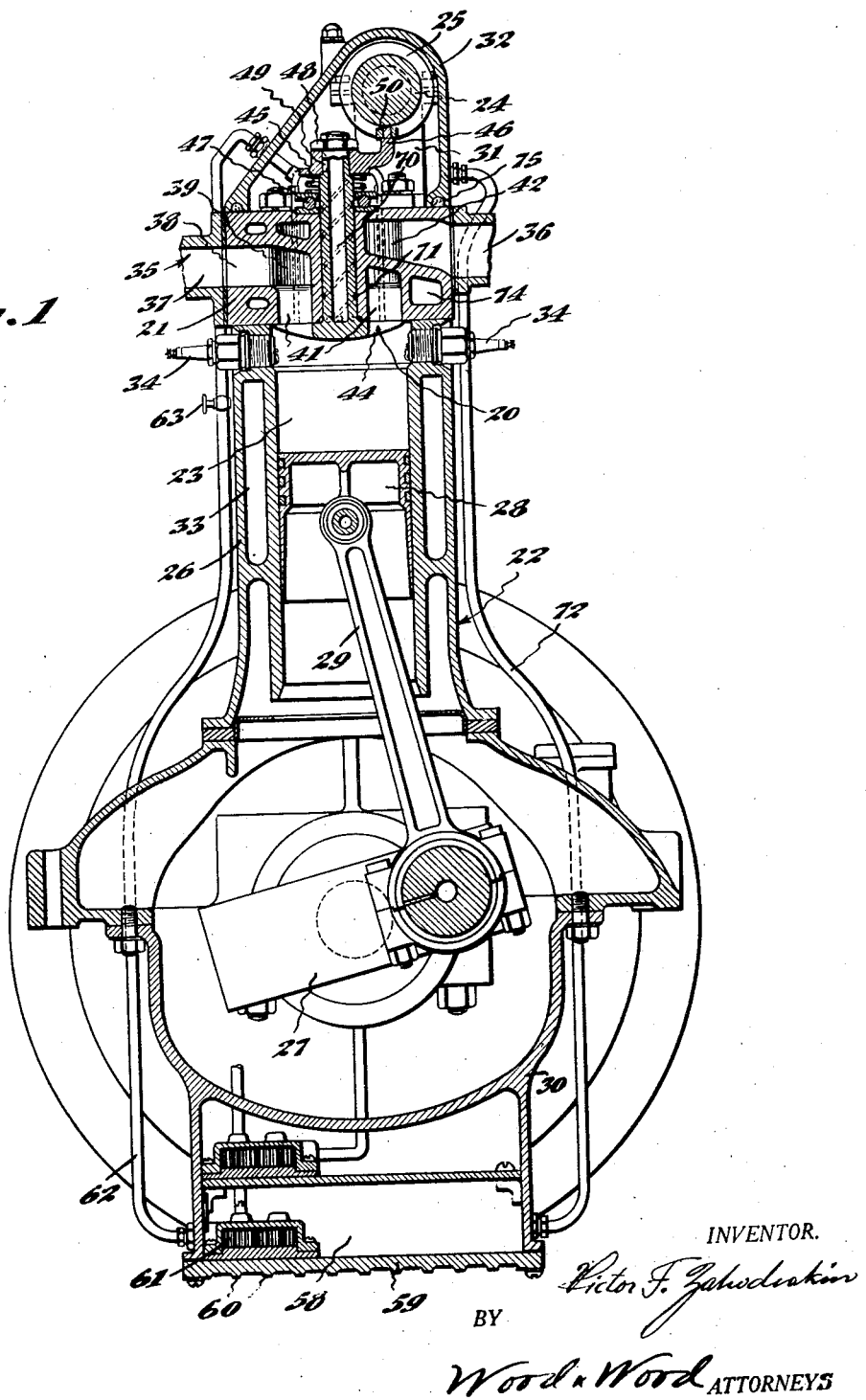
Figure 1 is a cross sectional view generally illustrating a combustion engine and showing the improved valves and valve arrangement in the cylinder head thereof as well as illustrating the extra cooling compartment in the crank case.
Figure 2:
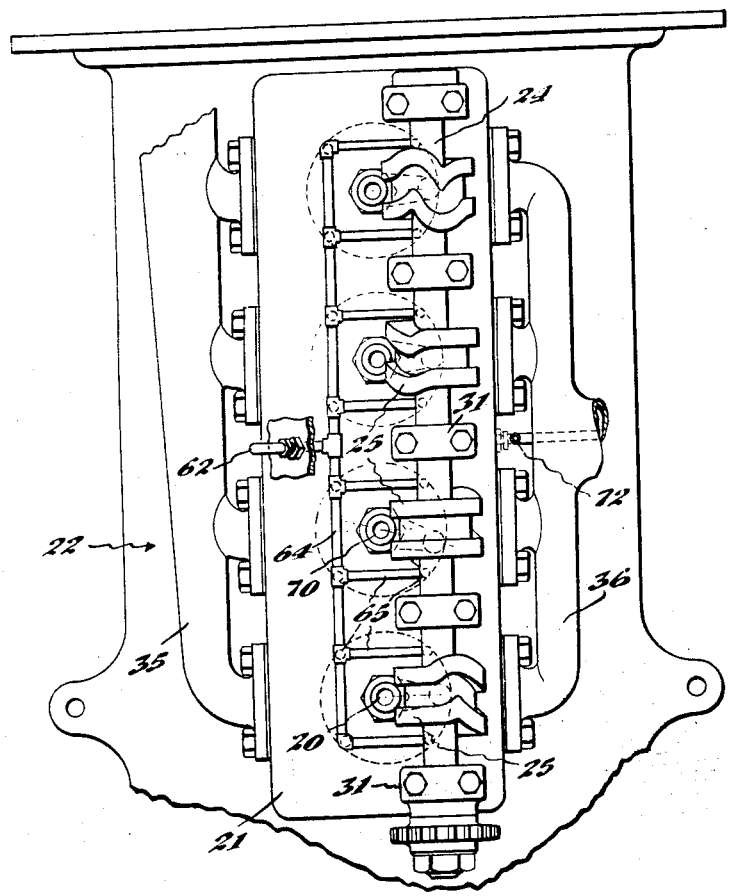
Figure 2 is a top plan view of Figure 1, illustrating the cam shaft for operating the valves and showing the lubricant and constant supply pipe arrangement to the cylinder head.
Figure 3:
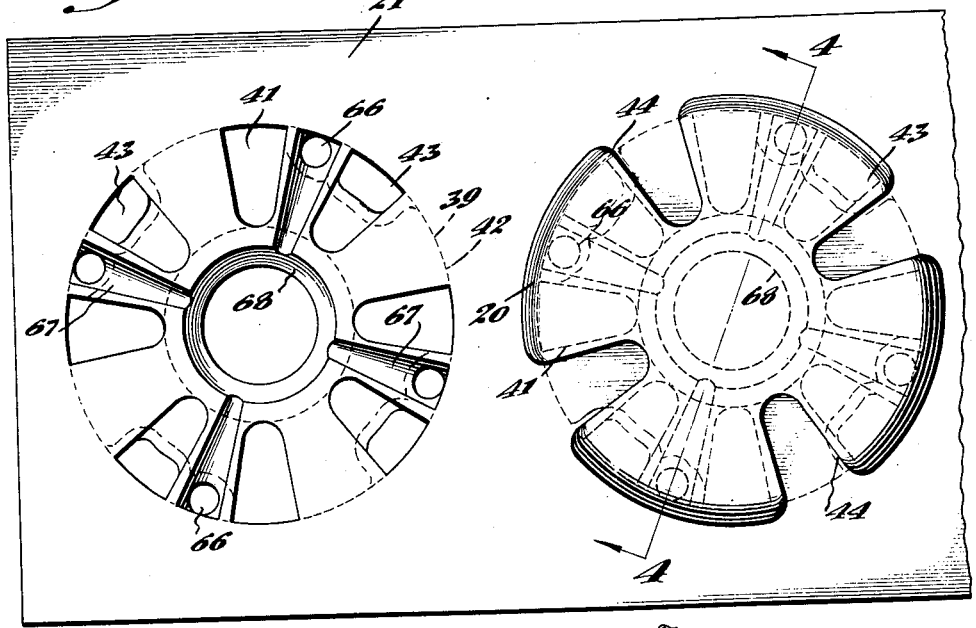
Figure 3 is a bottom view of a cylinder head showing one of the valves removed for illustrating the grooving and porting in the cylinder head and another of the valves in position relative to the oil grooving and the inlet and exhaust porting.
Figure 4:
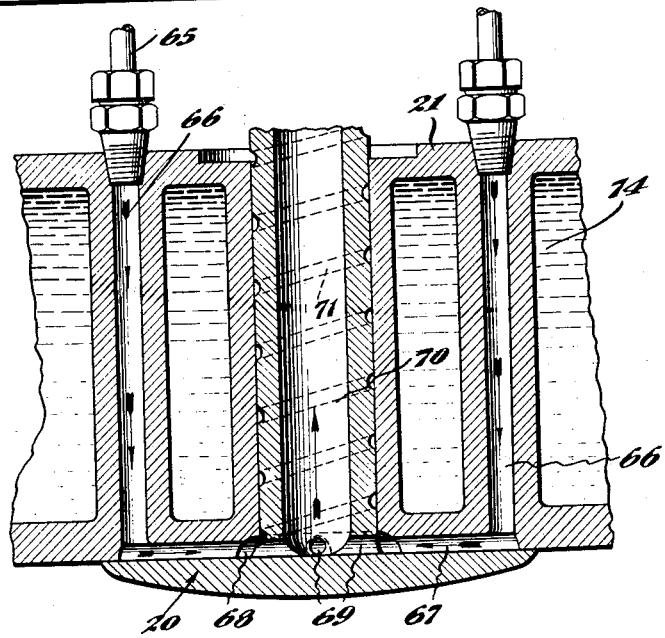
Figure 4 is a sectional view taken on line 4—4, Figure 3, showing the oil grooving for cooling and lubricating the oil supply passageways.

The valves 20 of this invention are arranged to oscillate on vertically disposed stems mounted within the cylinder head 21 of the motor 22 and in engagement with the underside of the cylinder head within the cylinders 23. The oscillation for the valves is provided through the medium of an overhead cam shaft 24 including a series of closed cams 25 secured thereon.

The motor 22 to which the valves are applied is of the conventional type with the exception of the features of this invention as set forth in detail herein. It, therefore, includes a cylinder block 26 having a plurality of cylinders 23 therein, the number of which is entirely arbitrary, a crank shaft 27, and the appropriate pistons 28 in the cylinders 23 connected to the crank shaft 27 by piston rods 29. A crank case 30 is provided, being constructed to accommodate for the valve oiling and cooling system independently of the main motor oiling system. The cylinder head of the motor is specially constructed for the valves, porting, and cooling and oiling system and carries brackets 31 for mounting the cam shaft which actuates the valves. An appropriate cover or oil case 32 is mounted and sealed on the cylinder head for housing the valves and operating means. No further description is given herein of the construction of the cylinder block 26 and its contained mechanism except to say that it includes the usual water jacket 33 and the spark plug 34, or spark plugs 34, 34 if dual ignition is preferable, screwed into the sides of the cylinder block at the extreme upper ends of the cylinders at points above the water jacket, this arrangement of the spark plugs with the points efficiently disposed, well spaced apart and down from the top of the cylinder, being possible due to the mounting of the valves entirely in the cylinder head against the upper end of the cylinders or the underside of the cylinder head.

The cylinder head 21, which is detachably secured to the cylinder block by screws, has connected thereto the intake manifold 35 and the exhaust manifold 36 at its respective sides. The gas inlet manifold has a lateral passageway 37, for each cylinder, connecting to a transversely entering passageway 38 in the cylinder head which passageway enters an annular chamber 39 having downward extensions providing four inlet ports 41 into the cylinder. The same arrangement is true of the exhaust passageway, the casting of the cylinder head being arranged to provide an annular exhaust chamber 42 above and coaxial with the chamber 39 and to include exhaust ports 43 extended downwardly therefrom. The ports 41, 43, are arranged circumferentially of the axis of each cylinder and in pairs, each pair consisting of an exhaust and inlet port, and the pairs at 90° generally about said axis.

The circumferentially arranged ports are disposed over an area which represents substantially the entire top or upper end of the cylinder and in order to cover and uncover these ports, the valve head is of substantially the same diameter as the cylinder diameter or somewhat larger if desired, as permitted by the counterboring of the cylinder at the upper end providing a compact combustion chamber.

The valve stems are rotatably mounted through vertical bores in the cylinder head coaxially with the cylinders. Each valve head is radially slotted, the slots 44 being either equal to or larger than and of the substantial shape of the exhaust and inlet ports for fully clearing the same when the valve is in fully opened position. The arrangement of the ports is such that there is an area between pairs over which the slotted portions of the valve heads may be disposed permitting the head to fully close all the ports during the compression and firing strokes of the pistons.

It is preferable to maintain the valve heads on their respective seats by spring pressure urging the valves upwardly, these springs 45 lying against the top of the cylinder head between operating arms 46 and thrust ball bearings 47 lying directly against the cylinder head.

The upper end of each valve stem is counterturned and the operating lever or arm 46 is held against the shoulder by means of a nut 48 screw-threaded on the extreme upper end of the stem, the arm or lever being rotatively fixed to the stem by means of a key 49. The cam shaft 24 has a plurality of the closed cams 25 thereon, one for each valve, which cams engage rollers 50 mounted on the angular extensions of the arms. No description is given of the special circumferential variation of the cams relative to the shaft to accomplish the timing of the valves since this is conventional and well understood.

A series of the bearing brackets 31 for journalling the cam shaft may be fixed to the top surface of the cylinder head and the cover 32 is of suitable shape for housing the cam shaft and cam operating means, being attached and sealed upon the cylinder head, the purpose of the sealing being more apparent hereinafter.

The closed cams of the cam shaft impart timed oscillating motion to the respective valves. The valve heads are maintained snugly against their seats by the spring pressure, the compression in the cylinders is perfectly maintained and the effect of oscillation is to cover and uncover the exhaust and inlet ports through the radial slots 44.

Referring to Figures 10 and 14 inclusive, which views have been to illustrate the cycle of operation of a particular valve and starting the cycle at the firing stroke of the piston, the valve is shown fully closed in Figure 10. Immediately thereafter and as the piston starts its travel upwardly for the exhaust stroke, the valve is oscillated as shown in Figures 11 and 12, to uncover the exhaust ports 43, the upward stroke of the piston expelling the burnt or exhausted gas through these ports.

As the piston starts downwardly after the exhaust stroke, the exhaust ports 43 are covered and the inlet ports 41 are uncovered as shown in Figures 13 and 14 so that the downward stroke of the piston draws in the new or fresh charge of gas. When the piston has reached the bottom of its suction stroke and has started back, the valve is again fully closed for the compression stroke as shown in Figure 10. It will be apparent that the oscillation of the valve takes place between adjacent exhaust and inlet ports of the respective pairs or groups and that the valve is stationary during the compression and firing strokes, and moreover, that the valve never leaves its seat at any time but is oscillated in constantly snug contact with the seat.

Figure 15:
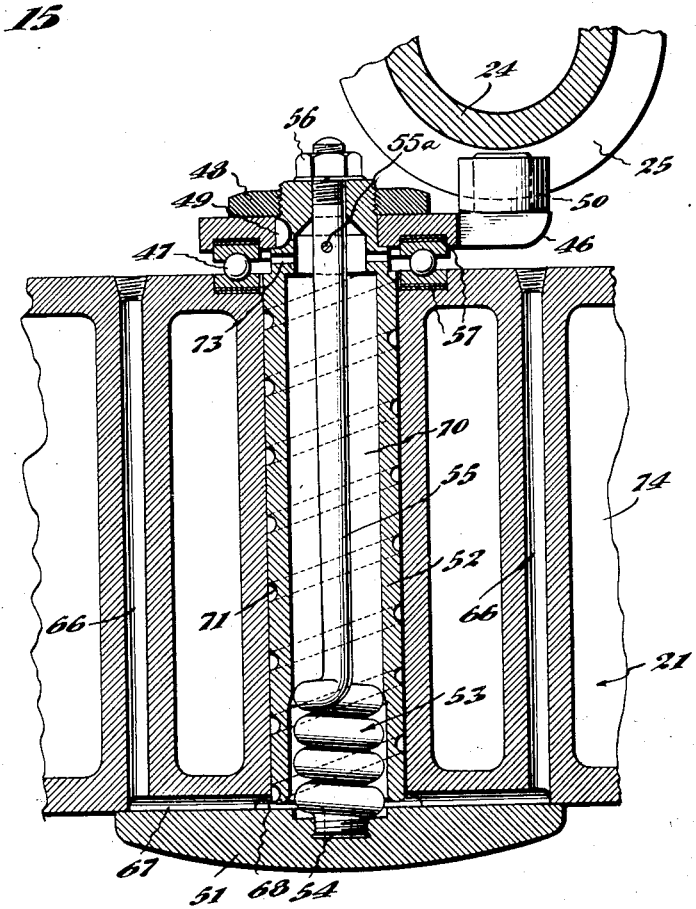
Figure 15 is a fragmentary sectional view taken similar to the corresponding portion of Figure 1 and illustrating a variation or modification in the valve construction.
Figure 16:
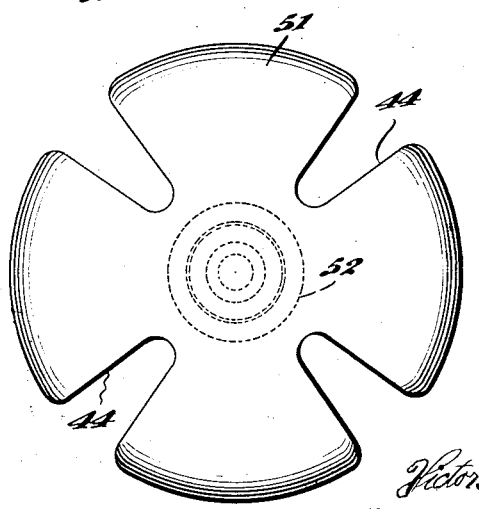
Figure 16 is a bottom view of the valve head.

In Figures 15 and 16, a modified form of valve has been disclosed wherein the head 51 of the valve and the stem 52 are separate parts joined together by means of a heavy spring 53 having no rotative flexibility. The valve stem 52 is of sleeve form and the spring 53 is disposed within the stem and has a specially formed screw-threaded lower terminal 54 screwed into the valve head. A clearance space is provided between the valve head and the lower end of the stem.

The spring has comparatively few coils, its upper end consisting mainly of a rod portion 55 extending through the extreme upper end of the stem and drawn upwardly by means of a nut 56. The spring and the head carried thereby are rotatively fixed to the stem by means of a cross pin 55ª. The operating arm 46 is secured on the stem in the same manner as that form of valve previously described, but in this case is held downwardly directly against the thrust bearing 47 recessed in the upper surface of the cylinder head. The head and stem are thus flexibly drawn together axially and the head is maintained in close contact with the seat of the cylinder head at all times, despite any disalignment of the valve seat which may occur relative to the valve head and stem.

The questions of valve warpage are obviated by the extremely low temperatures at the valves and the contraction and expansion of the cylinder head and other parts does not effect the proper seating of the valve head since the spring is the adapter between valve and stem. Universal motion of the valve head relative to the stem is therefore provided and the proper seating is automatic and in perfect relation to the seat. Shims 57 may be included above and below the thrust bearing for varying the tension of the springs additionally to the adjustment afforded by the screw-threaded connection.

The valve head in either form is entirely of spherical configuration, this being true of diametric section as well as the section through the wings of the valve as shown in Figure 9. The spherical contour of the valve head gives it a rounded construction and prevents pre-ignition since the heat does not collect at the sharp corners but is rapidly dissipated through uniform distribution.

Due to the rapidity of oscillation of the valve and the extremely high temperatures present in the cylinder, an oil supply means has been provided for lubrication and cooling of the valves and the environment thereof. The oil for this purpose is supplied from a separate compartment or oil case 58 having a specially formed bottom surface for cooling the oil. It is preferable to have this oil case entirely apart from the regular oil pump of the conventional motor. The compartment 58 is located beneath the main conventional crank case and its pump chamber and has the bottom 59 which is specially constructed for rapid cooling by virtue of the provision of heat radiating fins 60 thereon. The supply of the oil from the pump 61 is through a pipe 62 extending upwardly and containing a control valve 63 which is automatically or manually regulated to control the flow of oil, depending on the heat conditions in the environment where the motor is being used.

The oil supply pipe 62 extends to a manifold 64 attached to the cylinder head providing four supply or inlet pipes 65 extending to each valve region or cylinder. These four supply pipes are connected to vertically arranged passageways 66 extending through the cylinder head and entering grooves 67 radially disposed relative to the valve axis in the underside of the cylinder head within the area covered by the valve and between the exhaust and inlet ports of each pair. The grooves 67 extend radially inwardly to a circular groove 68 provided on a radius substantially the same as the radius of the valve stem. The oil is thus supplied to the surface of the oscillating valve and the seat as well as to the region around the jointure of the stem and valve head. Radial ports 69 are provided in the valve stems and are extended to the hollow interiors 70 thereof whereby the oil is free to circulate within the valve stems. A spiral groove 71 may be laid about the stem communicating at the lower end with the circular groove 68 and opening to the region within the upper casing 32, at the upper end of the stem. The oil is returned from the upper casing 32 to the extra cooling compartment through piping 72.

If desired, through the spiral groove, the oil can be circulated about the stem as well as within its hollow interior. From the hollow interiors of the valve stems the oil is discharged into the upper chamber through radial ports 73 in the extreme upper end of the stem or through the upper end of the stem. The lubricant is introduced under constant pressure from the pump and the temperatures are therefore considerably reduced about the valves in addition to the oiling of the contacting surfaces. Not only is the region of the valve seat and the valve head cooled, but the oscillating stem is cooled as well, this cooling being in addition to that provided through the water jacket 74 disposed within the cylinder head and around the exhaust and inlet ports.

The oil is rapidly passed under pressure through the two chambers, the upper casing and the lower compartment, and the valve in the feed pipe may be suitably adjusted to control this flow depending on the conditions of temperature of the motor. The upper cover or casing is secured in place by a conventional means and is sealed by means of a gasket ring 75 extended around the lower casing edge within a groove thereof. The sealing of this casing as well as the pump compartment is designed to prevent leakage of oil circulating under moderate pumping pressures.

Figure 17:
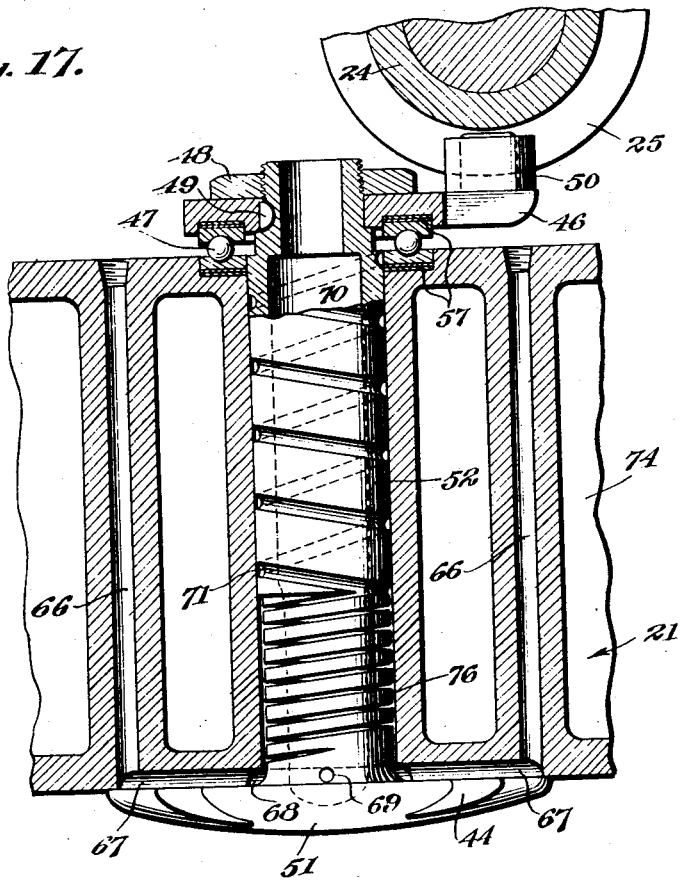
Figure 17 is a sectional view taken similar to Figure 15 but illustrating another modification of the valve.
Figure 18:
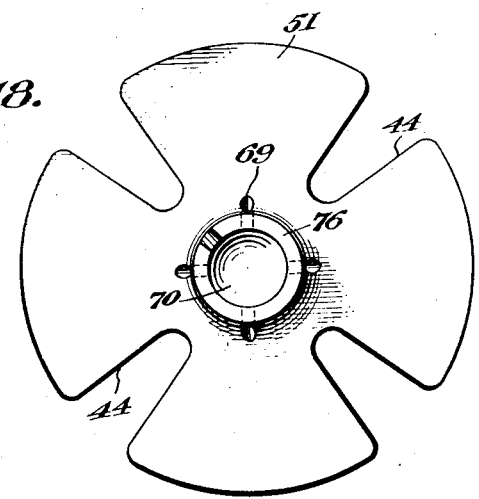
Figure 18 is a view taken through the stem of the valve of Figure 17.

Figures 17 and 18 illustrate another form of one-piece valve structure wherein the flexibility of the valve between head and stem is obtained through an integrally formed spring portion. With the exception of this spring provision the valve of these figures is the same as the main form insofar as general structure and mounting are concerned.

The tubular valve stem 52 is counterturned at its lower end adjacent the head providing a slight clearance between the bore in the cylinder head and the stem portion. This counter-turned portion is spirally cut to form a coil spring 76 joining the head and the upper end of the stem and acting as the adapter or flexible means permitting the head to universally adjust itself to its seat and permitting extension of the stem without valve breakage as expansion and contraction of the cylinder head occurs. The clearance between the spring portion and the bore wall being relatively slight any lateral bulging of the spring results in the spring bracing against the bore.

Having described my invention, I claim:

1. An internal combustion engine, comprising, a cylinder block, a cylinder head having inlet and exhaust ports for each cylinder, an oscillating valve for each cylinder adapted to cover and uncover said ports, means for operating said valves, a pump for supplying oil to said cylinder head, conduits extending from said pump to the seating surfaces of the valves and said valves having tubular stems and ports adjacent the heads thereof for connecting the oil supply at the seating surfaces of the valves to the interiors of the stems thereof.

2. In an internal combustion engine, a cylinder block, a cylinder head having inlet and exhaust passageways to said cylinder, an oscillating valve for each cylinder mounted in said cylinder head, said valves constantly seated and having portions adapted to alternately cover and uncover said inlet and exhaust passageways, said cylinder head having oil grooves formed therein between the inlet and exhaust ports in portions always covered by the valve portions, and means for supplying a rapid and cooling flow of oil to the grooves.

3. An internal combustion engine, comprising, a cylinder block, a cylinder head having inlet and exhaust ports for each cylinder entering the tops of the cylinders, an oscillating valve for each cylinder adapted to cover and uncover said ports, means for operating said valves, a pump for supplying lubricant and coolant to said cylinder head, conduits extending from said pump to the contacting surfaces of the valve head and the tops of the cylinders, conduits formed along the valve stems for continued flow of oil from the valve head upwardly through the cylinder head, an oil case housing the valve operating means and the upper ends of the valve stems, and a conduit extending from said oil case to the pump for returning the lubricant and coolant.

4. In an internal combustion engine, a cylinder block, a cylinder head having an inlet port and an exhaust port for each cylinder extending downwardly to enter the top of the cylinder, an oscillating valve for each cylinder mounted in the cylinder head and having its head flexibly connected to its stem and seated against the top of the cylinder, spring means for urging said head into snug contact with the top of the cylinder, means for oscillating said valves to cover and uncover said ports, and oil supply means for feeding oil between the valves and their respective seats.

5. In an internal combustion engine, a cylinder block, a cylinder head having gas inlet and exhaust ports formed therein for said cylinders, oscillating valves having stems mounted in said cylinder head and heads seated against the underside of the cylinder head and formed to cover and uncover said ports, oil pressure supply means, said cylinder head containing oil grooves in the valve seats extending toward the valves axes and supplied by said supply means, each stem including a spirally laid groove in its outer surface and extending through the top of the cylinder head, a sealed casing surrounding the region over the cylinder head, and an oil return means extending from said casing to the oil supply means.

6. In an internal combustion engine, a cylinder block, a cylinder head having gas inlet and exhaust ports formed therein for said cylinders, oscillating valves having stems mounted in said cylinder head and heads seated against the underside of the cylinder head and formed to cover and uncover said ports, oil pressure supply means, said cylinder head containing oil grooves in the valve seats extending toward the valve axes and supplied by said supply means, said stems of hollow construction and having inlet ports at the bases thereof and outlet ports at the tops thereof, a sealed casing surrounding the region over the cylinder head, and an oil return means extending from said casing to the oil supply means.

7. In an internal combustion engine, a cylinder block, a cylinder head having inlet and exhaust ports therein, oscillatable valves having their stems mounted through said cylinder head and their heads seated against the underside of the cylinder head within the respective cylinders, means urging said heads against their seats, and coil springs connecting said stems and heads whereby universal seating of the valve head is permitted and the stem is extensible.

8. In an internal combustion engine, a cylinder block, a cylinder head having inlet and exhaust ports formed therein, an oscillatable valve for each cylinder, comprising, a stem mounted in said cylinder head and a head seated against the underside of the cylinder head within the cylinder and adapted to cover and uncover said ports, means for actuating said valves, said valve stems having integrally formed coil spring portions at their lower ends joined to the heads for universal seating of the head and extensibility of the stem, and means for maintaining said heads on their seats.

9. In an internal combustion engine, a cylinder block, a cylinder head having inlet and exhaust ports formed therein, an oscillatable valve for each cylinder, comprising, a stem mounted in said cylinder head and a head seated against the underside of the cylinder head within the cylinder and adapted to cover and uncover said ports, means for actuating said valves, said valve stems having integrally formed coil spring portions at their lower ends joined to the heads for universal seating of the head and extensibility of the stem, said coil spring portions of slightly smaller diameters than the bores housing the stems to permit free action thereof and to brace the coil spring portions against the bores in case of bulging laterally, and means for maintaining said heads on their seats.

In witness whereof, I hereunto subscribe my name.

VICTOR F. ZAHODIAKIN.